Sept. 18, 1934.  V. H. KELLEY  1,973,813
PROCESS AND APPARATUS FOR TREATING SUBMERGED SURFACES
Filed April 26, 1932  3 Sheets-Sheet 1
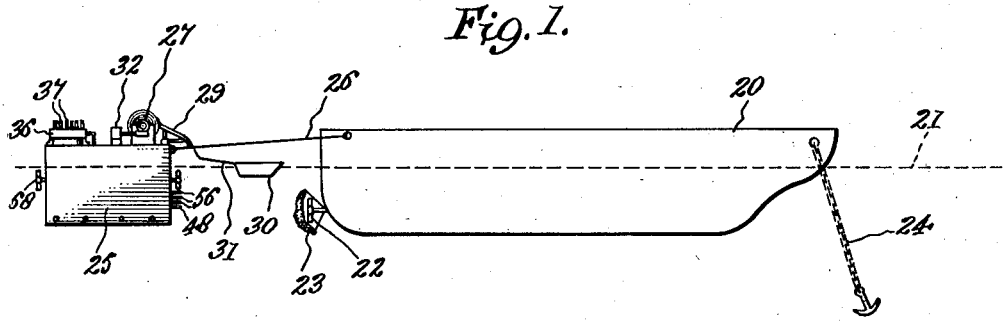
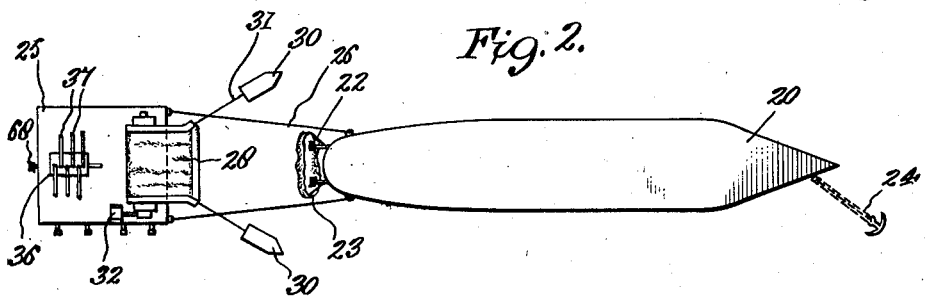
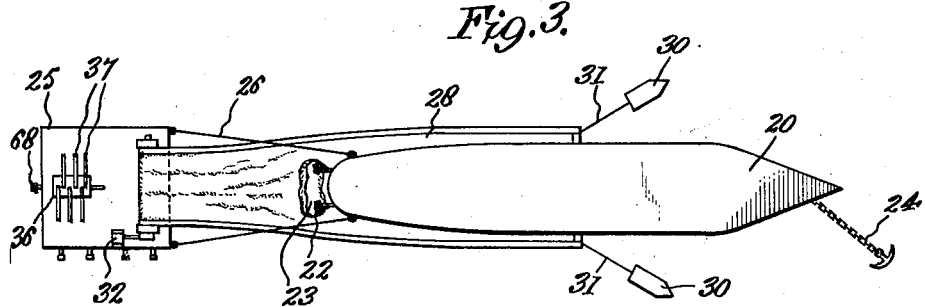
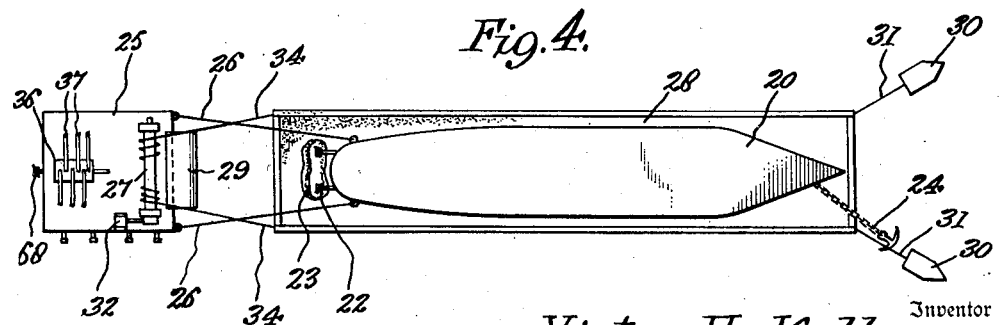
Inventor
Victor H. Kelley
By
Wilkinson & Mawkinney
Attorneys

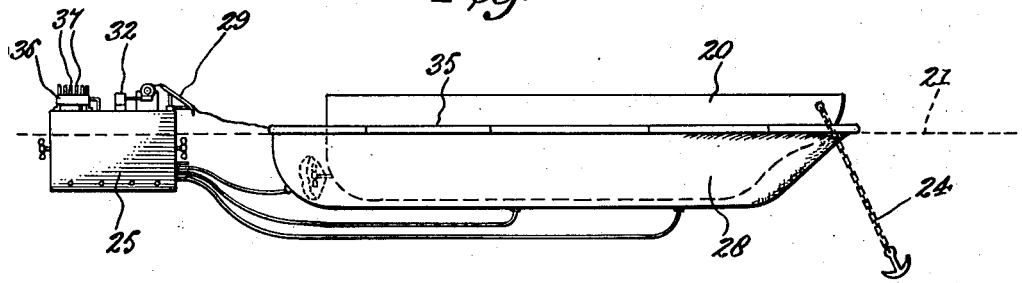
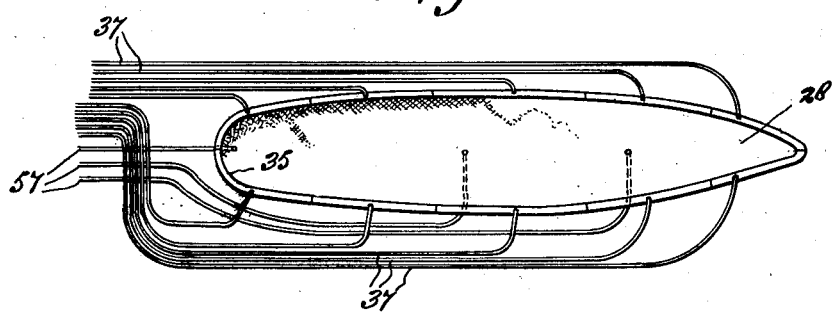
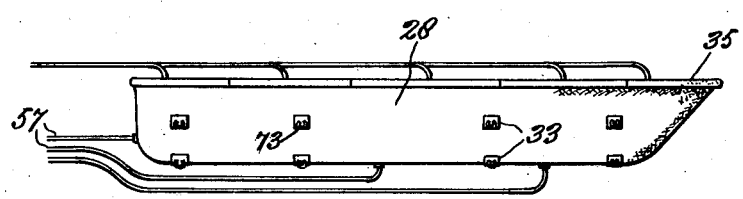
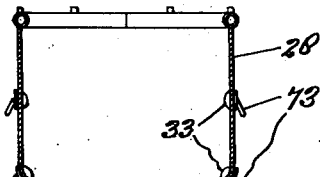

Sept. 18, 1934.  V. H. KELLEY  1,973,813
PROCESS AND APPARATUS FOR TREATING SUBMERGED SURFACES
Filed April 26, 1932  3 Sheets-Sheet 3

Inventor
Victor H. Kelley
By Wilkinson & Mawhinney
Attorneys

Patented Sept. 18, 1934

1,973,813

UNITED STATES PATENT OFFICE 1,973,813

PROCESS AND APPARATUS FOR TREATING SUBMERGED SURFACES

Victor H. Kelley, Los Angeles, Calif.

Application April 26, 1932, Serial No. 607,657

10 Claims. (Cl. 114—222)

The present invention relates to an improved apparatus and a novel process for treating submerged surfaces, such as the bottoms of ships and the walls of pipes, pumps and other submerged apparatus for cleaning such surfaces of marine growths and maintaining the surfaces in a clean condition.

It is well known that the bottoms of ships and vessels habitually in the water become fouled by the growth and accumulations thereon of various forms of marine growth which may be of animal, plant or fish origin, and which may assume mineral or inorganic structure of form, and may be of fresh or salt water origin. The various and numerous disadvantages of this accumulation or growth on the bottoms of ships and the like, are well known to those skilled in the art and among which may be chiefly mentioned the increase in power and in propeller thrust required for maintaining the machinery of the water craft at the desired propeller speed and the subsequent loss of speed of the craft at that propeller speed with the incident increased wear of the machinery and increase in the consumption of fuel; the increased corrosion of the underwater surfaces exposed; and the great loss of the use of the vessel occasioned by the dry-docking of the vessel for cleaning the surfaces and the increased expense occasioned thereby in carrying out the frequent cleaning operations which are so essential.

An object of the present invention is to provide an improved apparatus by the use of which the marine growth may be prevented or destroyed and not only arrested in their growth to prevent increase in the size and development thereof but damaged to such an extent that the growths by the frictional contact of the adjacent surface layers of water on the exposed surfaces may be removed therefrom.

Another object of the present invention is to provide an apparatus and a process which may be used to prevent the disadvantages occasioned by the growths and which may be carried out without any appreciable loss of time in the operation of a ship and which may be operated and carried out economically and without dry-docking the ship.

The invention also provides improved means wherein submerged surfaces of a ship or otherwise, may be treated chemically by adding to the surrounding water in contact with the submerged surfaces, certain chemicals which will have a certain chemical action upon the growths to insure the thorough treatment and impregnation of the growths with the chemical fluid for checking, preventing or destroying the growths and for accelerating the absorption of the chemicals so that the treatment will be effective and rapid and so that the chemical agents used and which are harmful to marine growths will not only arrest the development and destroy the growths but will act quickly and efficiently.

A further object of the present invention is to provide means for entrapping the water surrounding a vessel and treating the water with a chemical agent harmful to marine growth, and then removing the entrapped treated water and substituting therefor the untreated water so that the treated water may be carried off without admixing with the normal untreated water which would otherwise be injurious to marine life, fish and the like in rivers, harbors and other ports in which the ship might be treated.

The invention also aims at the provision of a novel construction of apparatus and novel means of operating the same for accomplishing the best results.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of the hull of a vessel with the apparatus of this invention connected thereto and ready for application.

Figure 2 is a top plan view of the same.

Figure 3 is a top plan view of the same, showing the apparatus partly applied.

Figure 4 is a like view showing the envelope in fully stretched position and ready for operation of the apparatus.

Figure 5 is a side elevation of the ship with the apparatus applied thereto and connected for supporting the envelope and for the transfer of the entrapped water about the hull and the apparatus for chemical treatment.

Figure 6 is a top plan view of the envelope alone, showing the controlling pipes or tubes for the air pockets at the top of the envelope, and liquid transfer tubes at the bottom of the envelope.

Figure 7 is a detail side elevation of the envelope after it has been applied to the hull, and showing the weights and handles for facilitating the adjustment or application of the envelope.

Figure 8 is a transverse section taken through the central portion of the envelope, showing the general configuration of the same and the weights for maintaining the envelope in shape.

Figure 9:
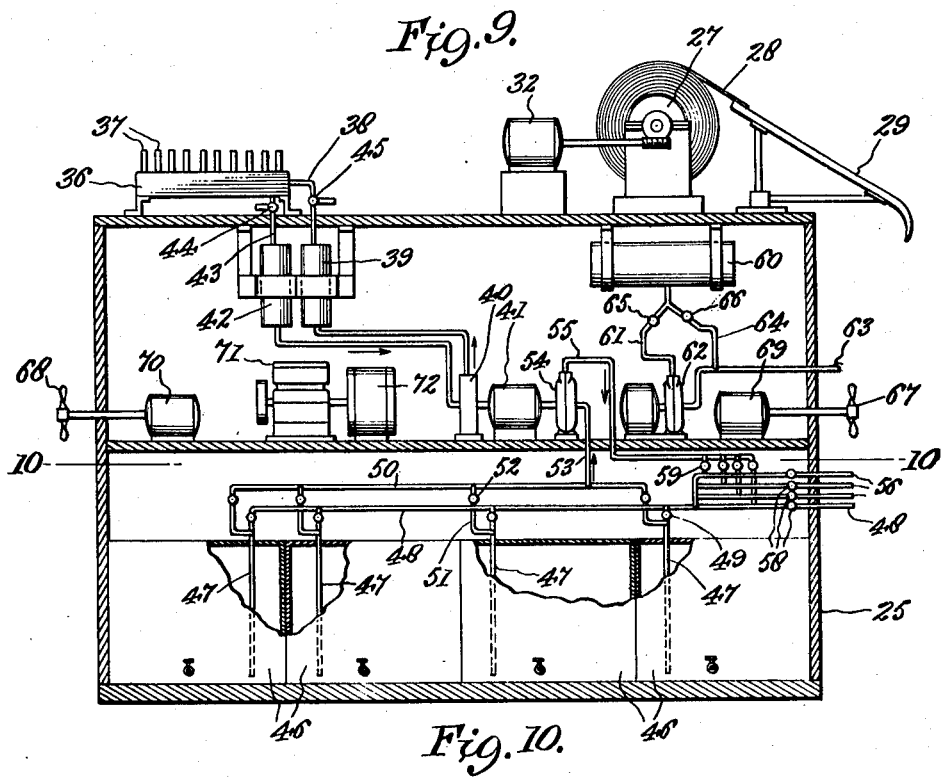
Figure 9 is a longitudinal section taken vertically through the barge, showing the various apparatus which may be employed for transferring and treating the various fluids used.
Figure 10:
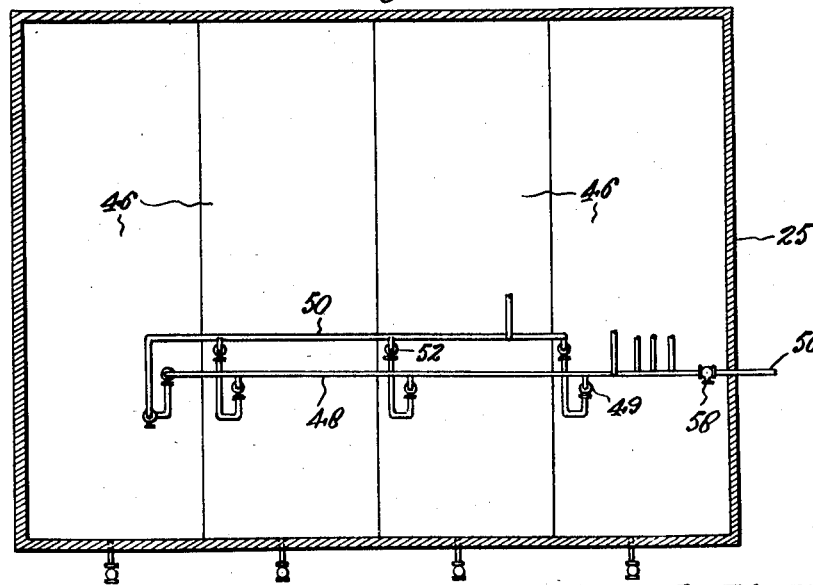
Figure 10 is a horizontal section taken through the same substantially on the line 10—10 of Figure 9

Referring now to the drawings, and first to Figures 1 and 2, 20 designates the hull of a ship adapted to be treated for the removal of marine growths, the dotted line 21 indicating the surface level of the water in which the hull 20 is supported. The hull 20 has a propeller 22 about which is placed a shield or guard 23 to prevent damage to the propeller by the envelope and other apparatus used. The hull 20 is held stationary by one or more anchors 24, and a barge 25, carrying the pumps and other machinery of the apparatus, is connected to one end of the hull 20 by cables 26 or the like, as shown. The barge 25 is provided on its deck with a large drum or roller 27 of suitable construction and length and which extends transversely of the barge preferably near its forward end, or its end near the vessel or hull 20. Rolled upon this roller 27 is an envelope 28 of rubber or other suitable flexible material and which may be gathered or folded transversely so as to accommodate the same upon roller 27 and at the same time admit of the quick and easy spreading of the envelope as the latter is moved from the roller for passage beneath the vessel 20. A guiding apron 29 is mounted upon the forward end of the barge 25 and is inclined forwardly and downwardly to support the envelope 28 and direct it toward the vessel 20. A pair of small boats or pontoons 30 are connected by cables 31 to the forward corners of the envelope 28. These boats 30 are adapted to travel outwardly and forwardly along the opposite sides of the vessel 20, as shown in Figure 3, for carrying and spreading the envelope as the latter is unwound from the roller 27 and so as to properly center the envelope beneath the vessel. The roller 27 may be operated in any suitable manner, such as by an electric motor 32 mounted on the barge 25 and the motor 32 may be driven in one direction for unwinding the envelope 28 as it is drawn forwardly and for driving the roller in an opposite direction to rewind the envelope after the operation is completed.

As shown to advantage in Figure 3 the envelope 28 is carried forwardly beneath the vessel 20 while the roller 27 is unwound and the envelope is provided with suitably arranged weights 33 spaced along the envelope, as best shown in Figures 7 and 8, for causing the envelope to assume the form of a basin, the enclosure extending about and beneath the vessel 20.

The envelope 28 is carried forwardly beneath the vessel until it reaches a point slightly beyond the bow of the vessel and the envelope 28 may be proportioned in shape sufficiently larger than the vessel to admit of the turning up of the opposite ends of the envelope as well as the sides thereof to provide a complete enclosure and thus entrap the water lying adjacent to the bottom of the ship. The rear or inner end of the envelope 28 is provided with cables 34 which are secured to the rear corners of the envelope and also secured to the roller 27 so that the rear end of the cable is supported from the roller during the unwinding and winding operations and so as to properly hold the rear end of the envelope in place about and beneath the ship during the use of the apparatus.

The lateral and opposite end edges of the envelope 28 are provided with any desired number of air pockets 35 adapted to be inflated after the envelope 28 has been positioned, as shown in Figure 4, so that the free edges of the envelope may rise above the surface level 21 of the water and thus completely enclose the bottom portion of the vessel from the surrounding water and to entrap only the adjacent surface layers to be treated. The barge 25, as best shown in Figure 9, is provided with a manifold 36 to which are connected a plurality of flexible pipes or hose 37 of sufficient length to extend along the opposite sides of the ship 20 where the flexible pipes are connected to the respective pockets 35. The manifold 36 is connected by a pipe 38 to a compression tank 39 adapted to maintain air under pressure from an air pump 40. The air pump 40 may be driven by an electric motor 41 or from any other suitable source of power. The intake of the air pump 40 may be connected to a suction tank 42 which in turn is connected by pipe 43 to the manifold 36. Vented valves 44 and 45 control the compression and suction through the tanks 39 and 42 to the manifold 36 and are alternately opened and closed for inflating and deflating the marginal air pockets 35 of the envelope.

The barge 25 is provided, preferably in its bottom, with a plurality of tanks 46 which are preferably independent one of another and which are each provided with a pipe 47 extending downwardly to a desired distance within the respective tank, and the pipes 47 are connected to a common pipe 48. Each pipe 47 has a control valve 49 therein, and below the control valves 49, the pipes 47 are connected to a second common pipe 50 by means of branch pipes 51 in which are placed control valves 52. The common pipe 50 is connected by a pipe 53 to the intake side of a pump 54. The outlet side of the pump 54 is connected to a pipe 55 which is connected by a plurality of small branches to the pipe 48 and also to pipes 56 which extend outwardly through the forward edges of the barge and which are connected to flexible hose or pipes 57 which in turn are detachably connected at various points to the lower portion of the envelope 28. The pipes 48 and 56 are provided with independent valves 58, and the pipe 55 is provided with an independent valve 59 at its connection with each of the pipes 48 and 56. By manipulation of the various valves between the pump 54, the tanks 46 and the pipes 48 and 56, the water entrapped in the envelope 28 may be withdrawn therefrom and be deposited in one or more of the tanks 46, and may be chemically treated and returned to the envelope for conducting the chemical to the exposed bottom of the hull or ship 20.

Of course, one or more of the tanks 46 may be provided with a chemical agent and this agent may be pumped into the envelope so that the sea water withdrawn from the envelope may be maintained intact and be subsequently returned to the envelope after the chemical agent has been returned to the barge. Thus, by the manipulation of these valves various pumping actions may be effected accordingly as is desired according to conditions under which the apparatus is operated. The pump 54 may be connected to the motor 41 as shown in Figure 9, or any other desired arrangement or source of power may be resorted to. The barge 25 is provided beneath the roller 27, with a counter-weight tank 60 connected by a pipe 61 with a pump 62. The intake side of the pump 62 is connected to a pipe 63 which opens through the outside of the barge 25 so as to take in a quantity of water which is pumped into the tank 60 as the envelope 28 is unwound from the roller 27. This is for the purpose of maintaining the equilibrium of the barge during the operation. As the envelope 28 is wound upon the roller the water in the tank 60 may be drained therefrom through a bypass pipe 64 which opens into the pipe 63 and the pipes 61 and 64 are controlled by valves 65 and 66 as is shown in Figure 9. The barge 25 may be provided with forward and rear propellers 67 and 68 connected respectively to the motors 69 and 70 for moving the barge, and an engine 71 of any suitable type may be employed for driving a generator 72 for supplying the various motors and apparatus with electric current. The illustration in Figure 9 is diagrammatical and various modifications, changes and detail equipment may be resorted to in the practical embodiment of the invention.

In order to facilitate the adjustment and handling of the envelope 28, the same may be provided with a pair of handles 73 advantageously located at the sides and bottom of the envelope 28 to admit of the shifting or pulling of the envelope at various points to obtain a desired adjustment, and to also admit of the folding or gathering of the envelope during its passage on to the roller 27.

The water entrapped within the envelope may be withdrawn therefrom and treated with any chemical agent which is harmful to marine growth and which may be in liquid or gaseous solution, and may contain the following or other elements either in free or combined state: Carbon, free or in mixtures of synthetic or natural organic compounds including crude petroleum and its derivatives or residues; any metal or earthy metal or compound containing the same; sulphur; chlorine; bromine; iodine; phosphorus, mercury, or hydrogen.

It is apparent that when the air pockets 35 are inflated that the envelope may be drawn upwardly to an extent sufficient to collapse the upper edges of the envelope against the ship or hull 20 so that the entrapped water is contained in a closed or sealed space. However, the envelope may be of such proportions that the pockets 35 merely float upon the surface level of the water and support the envelope in the form of an open tank.

In operation, the barge 25 is connected to one end of the ship 20 and the shield 23 is placed about the one or more propellers 22 of the ship. The roller 27 is now operated to unwind the envelope 28 and the small boats 30 are propelled outwardly and along the opposite sides of the ship 20 or by other means so as to spread the envelope 28, hold it in line with the ship 20 and to drag the envelope forwardly and about the ship as clearly shown in Figures 3 and 4. During this operation the handles 73 may be used so as to properly line the envelope with the bottom of the ship and to prevent the envelope from striking against the side of the ship should there be a tide tending to swing the envelope out of position.

As soon as the envelope 28 is properly centered beneath and about the ship, as shown in Figure 4, the valves of the manifold 36 are operated so as to inflate the pockets 35. The pockets 35 rise to the surface of the water and support the envelope in raised position and in closely spaced relation about the ship 20. The pump 62 is now set in operation and the various valves adjusted to withdraw the entrapped water within the envelope into one or more of the tanks 46 of the barge or to the sea. Due to the removal of fluid the envelope will then approach or "hug" the skin of the ship, lessening to a minimum the quantity of entrapped water. The water may be chemically treated and then returned to the envelope for treating the surface of the hull 20 and may be maintained in contact therewith for a desired period of time or may be renewed or agitated by operation of the pump 62. After the treatment is completed, the chemically treated water may be withdrawn to the barge and deposited into one of the tanks 46 and may then be retreated so as to remove all harmful ingredients therefrom before the water is finally discharged into the river, bay or other water course in which the barge is located. It is also evident that both time, period of application, and concentration of the chemical may be controlled.

In this way, the water is not polluted with chemicals and the operation may be carried on in rivers, bays, small harbors, or the like without damage to fishing or other normal use of the water.

It is obvious that various changes and modifications may be made in the details of construction and design of the above specifically described embodiment of this invention without departing from the spirit thereof, such changes and modifications being restricted only by the scope of the following claims.

What is claimed is:

1. In apparatus for treating the bottoms of ships and the like, a flexible envelope, means for placing the envelope about the bottom and sides of the ship, means for floating the free edges of the envelope to enclose the ship and segregate the water adjacent thereto, means for withdrawing the entrapped water from the envelope and treating the water with a chemical harmful to marine growth, and means for returning the chemically treated water to the envelope.

2. In apparatus for treating ships' bottoms, a flexible water-proof envelope, means for placing said envelope about the bottom of a ship, means for withdrawing entrapped water within the envelope, means for chemically treating the withdrawn water to kill marine growth, means for feeding the chemically treated water back into the envelope, and means for finally withdrawing the chemically treated water from the envelope after application to the marine growth.

3. In apparatus for treating ships' bottoms, a barge adapted to be attached to one end of the ship, a roller mounted on the barge, a waterproof flexible envelope carried by the roller, means connected to the envelope and adapted to be positioned along the opposite sides of the ship for dragging the envelope from said roller and beneath the ship, air pockets located in the free edges of the envelope, means for inflating said air pockets when the envelope is in position beneath the ship to raise the envelope about the sides and ends of the ship to entrap the water adjacent to the ship, and means for chemically treating the water entrapped in the envelope.

4. In apparatus for treating ships' bottoms, a barge, means for connecting the barge to a ship, a flexible water-proof envelope carried by the barge, means for transferring the envelope from the barge to the water beneath the ship, air pockets carried by the envelope, air control means on the barge for inflating said pockets to raise the envelope about the ship and entrap the water adjacent thereto, storage tanks mounted on the barge, a pumping system carried on the barge and connected to the storage tanks, flexible pipes connected to the pumping system and adapted for detachable connection with the envelope, said pumping system adapted to remove the water from the envelope to said tanks in the barge for chemical treatment in the water and adapted to return the treated water to the envelope for application to the marine growth on the bottom of the ship.

5. In apparatus for treating the bottoms of ships, a flexible envelope, means for placing the envelope beneath the bottom of a ship, air pockets carried by the envelope, means for inflating the air pockets to raise the edges of the envelope about the opposite sides of the ship for entrapping the water adjacent thereto, transfer means for withdrawing the entrapped water from the envelope, means for treating the withdrawn water with chemicals harmful to marine growths, means for returning the treated water to the envelope, and means for finally withdrawing the treated water after application to the bottom of the vessel.

6. That process of treating the bottoms of ships, which consists in entrapping the water adjacent to the ship's bottom, treating said water with a chemical harmful to marine growth, withdrawing the treated water to a point out of communication with the free water about the ship, and substituting untreated water for the treated water about the ship's bottom.

7. That process of treating the bottoms of ships, which comprises placing a water-proof envelope about the bottom of the ship for entrapping the water adjacent thereto, withdrawing the water from the envelope and chemically treating the water, returning the chemically treated water to the envelope for contact with the surface of the ship's bottom, and subsequently replacing the treated water within the envelope with untreated water.

8. That process of checking marine growths on the bottoms of floating vessels and the like, which consists in providing an isolated space of desired size and free of water between the bottom of the vessel and the surrounding water, introducing a chemical agent into the formed space for chemically treating the marine growths on the bottom, and withdrawing the chemical agent from said space subsequent to treatment while maintaining the surrounding water free of pollution by the chemical agent.

9. In apparatus for treating the bottoms of ships, an envelope adapted to surround the bottom of a ship, means for conveying a chemical agent to the space within the envelope for treating the bottom of the ship, and means for removing the chemical from within the envelope while maintaining the surrounding water free of pollution by the chemical agent.

10. That process of treating marine growths on the bottoms of vessels which consists in encasing the bottom of the vessel in an envelope, removing the water from the envelope, chemically treating the removed water, returning the treated water to the envelope for contact with the surface of the ship's bottom, and subsequently withdrawing the chemically treated water from the envelope while maintaining the surrounding water free of pollution by the chemically treated water.

VICTOR H. KELLEY.